United States Patent

[11] 3,576,044

| [72] | Inventor | Marcel Besnard<br>Romainville, France |
|---|---|---|
| [21] | Appl. No. | 795,261 |
| [22] | Filed | Jan. 30, 1969 |
| [45] | Patented | Apr. 27, 1971 |
| [73] | Assignee | Societe Anonyme Pour L'Equipment<br>Electrique Des Vehicules S.E.V. Marchal |
| [32] | Priority | Feb. 5, 1968 |
| [33] | | France |
| [31] | | 138,744 |

[54] MEANS FOR ATTACHING THE ARM OF A WINDSHIELD WIPER TO THE BLADE SUPPORT THEREOF
2 Claims, 5 Drawing Figs.

[52] U.S. Cl. .................................................... 15/250.32
[51] Int. Cl. .................................................... A47l 1/00,
B60s 1/02

[50] Field of Search............................................ 15/250.32,
250.33

[56] References Cited
UNITED STATES PATENTS
2,404,523  7/1946  Nesson ......................... 15/250.32
FOREIGN PATENTS
44,399  7/1956  Germany ...................... 15/250.32

Primary Examiner—Peter Feldman
Attorney—Holcombe, Wetherill & Brisbebois

ABSTRACT: Means for attaching a windshield wiper arm to a wiper blade support, said means comprising a male member provided with a cylindrical element having two diametrically opposed flattened surface areas, and a female member having a slot therein equal in width to the diametral distance between said flattened areas which terminates in a circular seat having a radius equal to that of said cylindrical member.

Inventor
MARCEL BESNARD
By Holcombe, Wetherill Brisebois
Attorneys

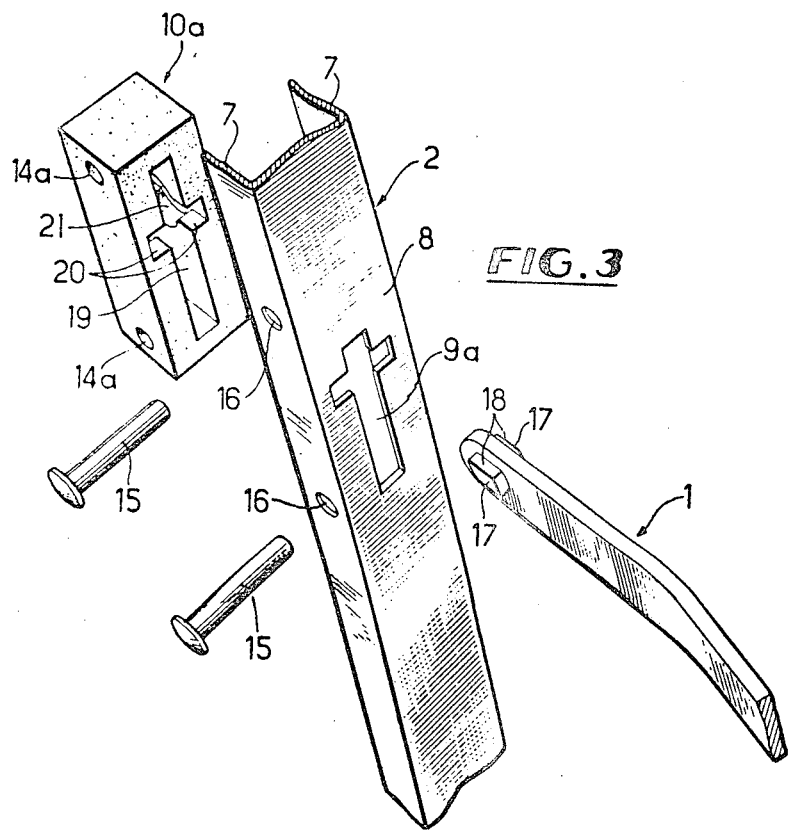
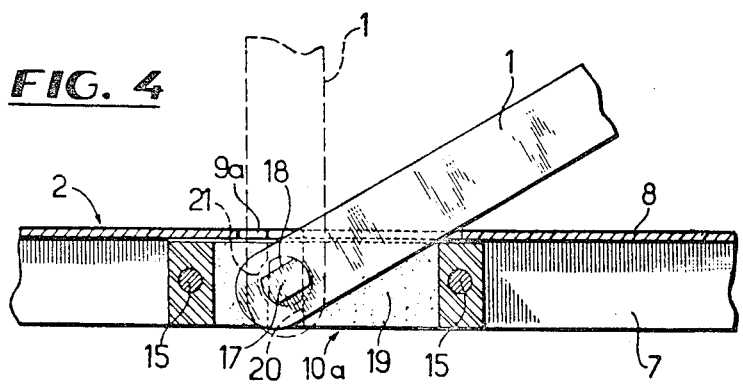

PATENTED APR 27 1971 3,576,044

Inventor

MARCEL BESNARD

By
Holcombe, Wetherill & Brisebois
Attorneys

MEANS FOR ATTACHING THE ARM OF A WINDSHIELD WIPER TO THE BLADE SUPPORT THEREOF

SUMMARY OF THE INVENTION

Windshield wipers for automobiles are driven by windshield wiper arms which are attached to the blade support of the windshield wiper by means of a bracket. In general, this bracket is a separate member attached to the blade support of the windshield wiper. It is the object of the present invention to provide a simple device which makes it unnecessary to attach a bracket to the blade support of the windshield wiper, while nevertheless providing means for fastening the windshield wiper arm firmly to the associated blade support.

The present invention is accordingly directed to the new article of manufacture which comprises an assembly formed by the arm of a windshield wiper and the associated blade support, which assembly is characterized by the fact that the means for fastening the arm to the blade support comprises, on the one hand, a male member comprising at least one cylindrical member, on which two diametrically opposed flat spots are provided, and on the other hand, a female member formed with at least one cylindrical recess of the same diameter as the cylindrical male member. This cylindrical recess is connected to the outside by a groove having a length equal to the distance between the two flattened spots on the cylindrical male member.

In a first embodiment of the invention the cylindrical recesses in the female member are in the windshield wiper arm and the male member is carried by the blade support of the windshield wiper. In this case the male member may be a member inserted into the blade support, which member is attached to said blade support by means of a rivet. This member is preferably made of a plastic material such as that sold under the trademark "Delrin," and comprises two parallelopipedic plates connected together by a cylindrical member provided with flattened areas. The assembly is pierced in alignment with the said cylindrical member to permit the passage of the rivet used to fasten the insert in the blade support.

In a modification of this first embodiment, the arm of the windshield wiper carries near the recesses in the female part of the pivotal mounting, between these recesses and the control means for the arm, guide means on opposite sides of the arm, which cooperate with the lateral edges of the blade support of the windshield wiper.

In a second embodiment of the invention the male member is the windshield wiper arm, which carries, on each side and near its end, two cylindrical bosses provided with diametrically opposed flattened areas. The female member is the blade support of the windshield wiper and the recesses in this female member which cooperate with said bosses are formed in an insert which is riveted to the blade support. The insert has the shape of a parallelopiped provided with a central hole through which the wiper arm passes. On opposite sides of this hole are grooves which open into semicircular seats. The diameter of each seat is substantially equal to the diameter of the cylindrical projections on the male member. The width of the slots is substantially equal to the distance between the flattened areas on each of the cylindrical projections on the male member.

In order that the invention may be better understood, two embodiments thereof will now be described, purely by way of example with reference to the accompanying drawings, in which:

FIG. 3 shows in perspective the different components of the assembly according to the invention in the embodiment in which the windshield wiper arm is the male member;

FIG. 4 shows in section the device of FIG. 3 with the windshield wiper arm in place on the associated blade support;

Figure 1:
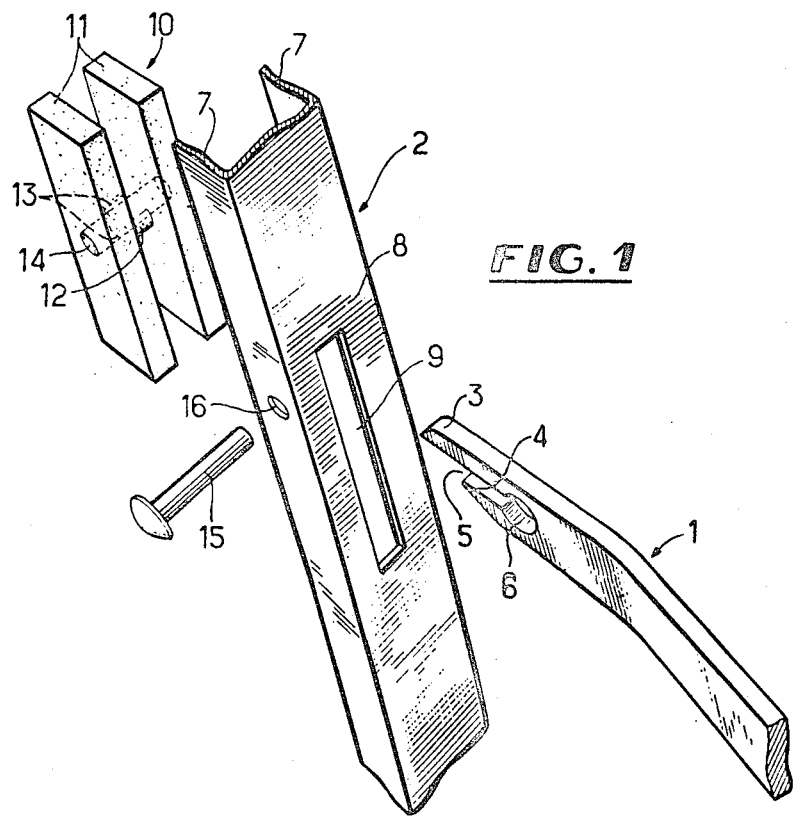
FIG. 1 shows in perspective the various components of the assembly according to the invention, in the embodiment in which the female member is the windshield wiper arm.

Referring now to the drawings, it will be seen that reference numeral 1 designates the windshield wiper arm as a whole, while 2 indicates the wiper blade support which is connected to said arm.

Figure 2:
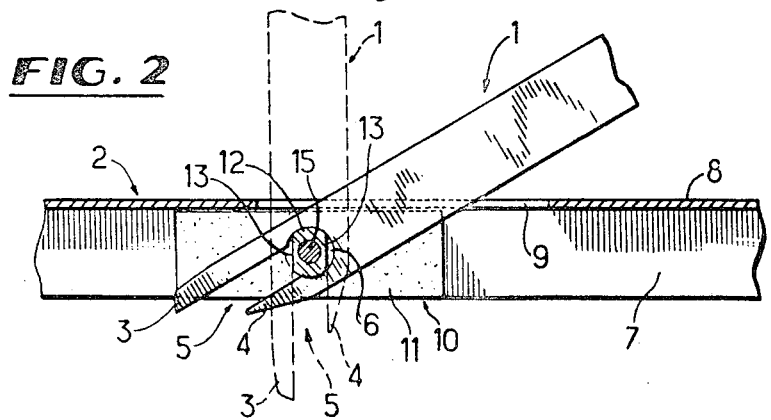
FIG. 2 shows in section the mounting of the windshield wiper arm of FIG. 1 on the associated wiper blade support.

Considering first the embodiment shown on FIGS. 1 and 2, it will be noted that the wiper arm 1 is provided, at the end which is to be connected to the wiper blade support, with two projections 3 and 4, with 3 being longer than 4. Between the projections 3 and 4 is a slot 5 which separates the two projections and opens into a circular hole 6, the center of which is in alignment with the axis of the slot 5, which is the same as that of the wiper arm.

The wiper blade support 2 is of a conventional type and consists of a U-shaped channel member to which the blade support of the windshield wiper is attached. This channel member has two sidewalls 7 and a bottom 8, which connects the two sidewalls. There is a rectangular hole 9 in the bottom near the place at which the arm of the wiper is to be attached to the blade support. This hole is a little wider than the arm 1 is thick.

Inside the channel member which constitutes the blade support is an insert 10 made of a plastic material such as that sole under the trademark "Delrin." This insert 10 consists of two lateral rectangular plates positioned face to face and connected at their centers by a cylindrical member 12. The cylindrical member 12 has two flattened areas 13 diametrically opposite each other. The diameter of the member 12 is substantially equal to that of the hole 6. The diametral distance between the flat areas 13 is equal to the width of the slot 5 between the projections 3 and 4 of the arm 1. The member 10 is positioned inside the channel member which constitutes the blade support 2. The rectangular plates 11 are not quite as high as the sidewalls 7 of the channel member so that they do not project out of the channel member when the member 10 is put in place. The member 10 is pierced, from side-to-side through its center, by a cylindrical hole 11, which extends through the two sidewalls 11 and the member 12.

The insert 10 is fastened to the blade support 2 by means of a rivet 15, which is inserted through the holes 16 in the sidewalls 7 of the blade support and the hole 14 in the insert 10. The holes 16 are in the same section of the blade support as the hole 9, and are near one of the ends of this hole.

When the arm 1 has been attached to the blade support 2 carrying the insert 10 fastened thereto by the rivet 15, the end of the wiper arm carrying the projections 3 and 4 is introduced into the hole 9, so that the arm is substantially perpendicular to the bottom 8 of the blade support. This position is shown in phantom lines on FIG. 2. During this step the wiper arm slides over the flattened areas 13 of the member 12, with the projections 3 and 4 embracing the two flattened areas. When, in the course of this step, the member 12 reaches the bottom of the cylindrical seat 6, the wiper arm 1 is swung obliquely. This is made possible by the cylindrical shape of the member 12, the diameter of which is substantially the same as that of the seat 6. This swinging motion is away from the side of the longer projection 3, so that when this oblique position is attained the projection 3 is nearer the bottom 8 of the blade support 2. When the wiper arm 1 is thus obliquely positioned, as it is in use, it is locked to the member 12 of the insert 10 because the member 12 has a diameter too great to pass through the slot 5 unless the longitudinal axis of this slot is parallel to the plane of the flattened areas 13, which occurs only when the wiper arm is vertical as it was when being attached to the blade support.

It should be noted that the device which has just been described is easy to make, and very inexpensive. Moreover, it provides a perfect connection between the arm and the blade support, which connection generates no noise during operation of the wiper due to the presence of the plastic insert 10.

In the embodiment shown in FIGS. 3 and 4, the male part of the assembly is the wiper arm 1 and the female part is the blade support 2.

The wiper arm carries on each side of one end a projection 17 in the form of a cylinder having two diametrically opposed flattened areas 18.

The blade support 2 is made, as in the first embodiment, from a U-shaped channel member having two sidewalls 7 and a bottom 8. A cruciform hole 9a is cut into the bottom 8. One of its branches extends longitudinally of the bottom 8 and is rectangular in shape, and the other branch is perpendicular thereto. Its width is equal to the distance between the two flattened areas 18 on a given projection 17, and its length in a direction perpendicular to the longitudinal axis of the bottom 8, is sufficient to permit the passage of that portion of the wiper arm which carries the two projections 17.

Inside the blade support 2 is an insert 10a, the shape of which is that of a parallelopiped. This insert is made of a plastic material such as that sold under the trademark "Delrin." The width of the insert 10a is substantially equal to that of the blade support, and its height is substantially equal to that of the sidewalls 7. The insert 10a is introduced into the blade support 2, to which it is fastened by means of two rivets 15 which pass through holes 14a in the ends of the insert 10a and holes 16 in the sidewalls 7 of the blade support. One of the holes 16 is near one of the ends of the longitudinal branch of the hole 9a. The other hole 16 is near the other end of the same branch, but in a section of the blade support beyond the end of the hole 9a.

A rectangular hole 19 extends from top to bottom through the central part of the insert 10a, perpendicularly with respect to the bottom 8 of the blade support. This hole runs longitudinally of the insert. In each of the two opposed lateral faces of the hole 19 is a recess made up of a vertical slot 20 extending all the way through the insert 10a and of a cylindrical seat 21, the center of which lies on the axis of the slot 20, midway of said slot. The diameter of the seat 21 is substantially equal to the diameter of the projections 17. The depth of each seat is substantially equal to the depth of the grooves 20. The width of the grooves 20 is substantially equal to the distance between the two flattened areas on a given projection 17. When the insert 10a is introduced into the blade support 2, the slot 20 is placed in registration with the transverse branch of the cruciform hole 9a.

When the wiper arm is to be attached to the blade support, the arm is brought perpendicularly toward the bottom 8 of the blade support 2, so that the projections 17 are brought into registration with the transverse branch of the hole 9a and the slots 20. The arm is then introduced into the hole 19, with the flattened areas 18 on the projections 17 sliding inside the slots 20 until these projections reach the cylindrical seats 21. This position is shown in phantom lines on FIG. 4. The arm of the wiper is then swung obliquely of the blade support in the direction permitted by the presence of the axial branch of the hole 9a which permits the arm to pass through the bottom 8. This oblique position is the operating position for the arm and blade holder. They are locked in this position because the cylindrical projection 17 cannot then come out through the slots 20 through which it was introduced.

The advantages of this modification are the same as those already set forth in connection with the first modification.

Figure 5:
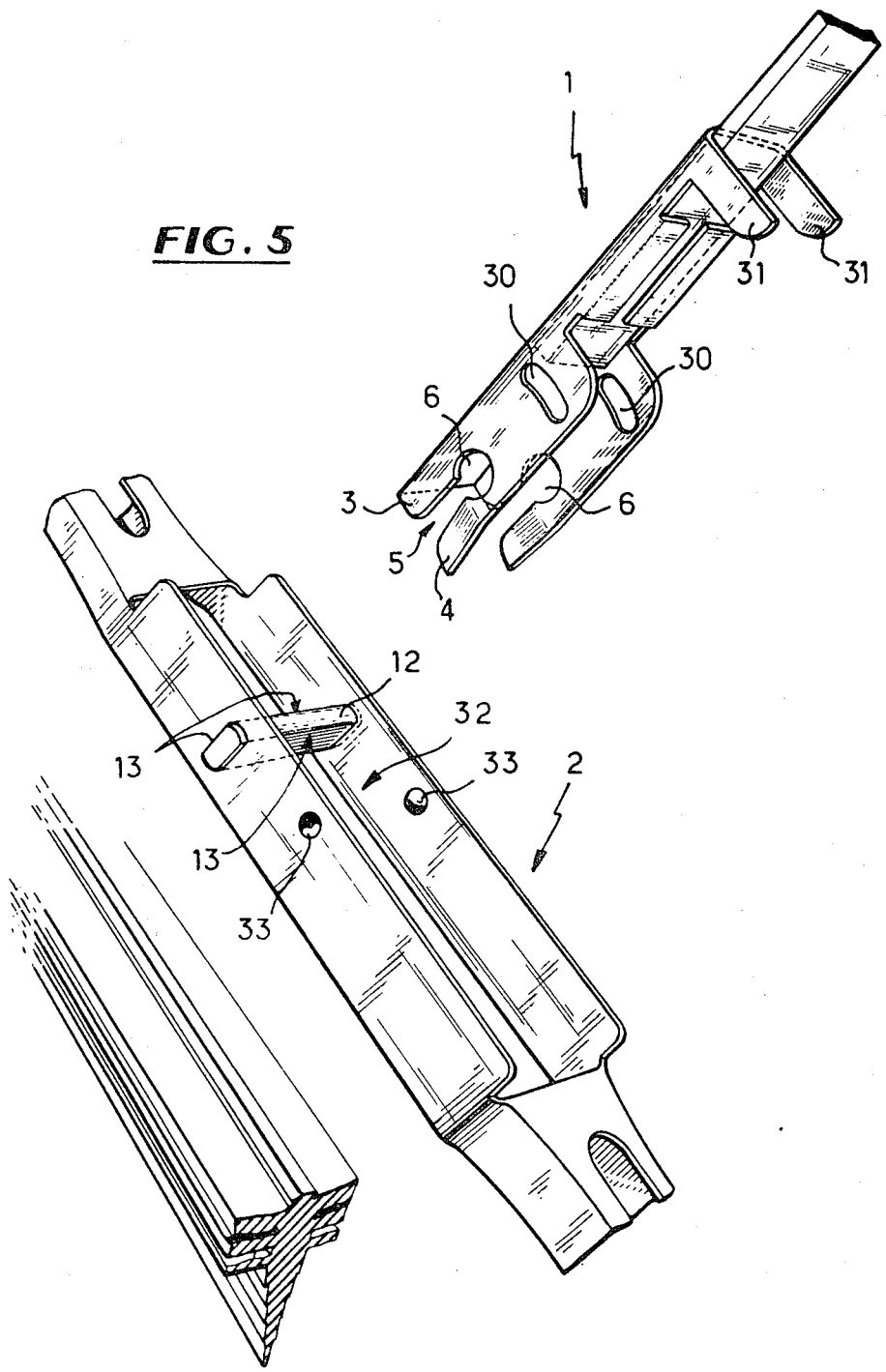
FIG. 5 shows in perspective a modification of the device shown in FIGS. 1 and 2, in which the arm of the windshield wiper comprises guide members which cooperate with the blade support of the windshield wiper.

In the device shown on FIG. 5 the pivotal connection is made in the same way as in the first embodiment shown on FIGS. 1 and 2. The female part is carried by the wiper arm and the male part by the blade support. In this embodiment the wiper arm 1 has a U-shaped section. Each of the sidewalls of the U carries two projections 3 and 4 which are equal in length and separated by a slot 5 which opens into a circular seat 6, the center of which is positioned in alignment with the longitudinal axis of the slot 5, which is parallel to the axis of the wiper arm 1. Each of said sidewalls is provided, behind the circular seat 6, with an oblong hole 30 the median line of which is a circular segment having as its center the center of the seat 6. Behind the hole 30 is a zone in which the sidewalls of the U-shaped wiper arm are bent back to fasten the U-shaped section to the arm proper. Finally, behind this zone are two wings 31 at the end of the U-shaped section.

The blade support 2 of the windshield wiper is made from a U-shaped channel member. An opening 32 is made by removing a section of the bottom of the channel member. On one side of this opening is a cylindrical member 12 mounted between the two sidewalls of the channel member, which sidewalls are, in this section of the blade support, higher than those in the remainder of the blade support. The cylindrical member 12 is provided with two flattened areas 13. The diameter of the member 12 is substantially the same as that of the seat 6. The distance between the flattened areas is substantially equal to the width of the groove 5. Each of the sidewalls of the blade support 2 is provided with a boss 33 a short distance from the cylindrical member 12 in the section in which the sidewalls of the blade support, beside the opening 32. The distance between the bosses 33 and the axis of the member 12 is substantially equal to the radius of the central line of the hole 30. The distance between the member 12 and the end of the opening 32 is greater than that between the center of the seat 6 and the most remote part of the members 31 of the channel member of the wiper arm 1.

The arm 1 is attached in the same way as described for the embodiment of FIGS. 1 and 2. The wiper arm is brought perpendicularly toward the blade support; the flattened areas 13 are slid along the slots 5 until the cylindrical member 12 reaches the seat 6; the arm 1 is swung about the member 12 and locked to the blade support as hereinbefore described. When the arm reaches its operating position, the sidewalls of the channel member at the end of the blade support come into contact with the bosses 33 and slide over them until the bosses are snapped into the guide slots 30. Moreover, the side members 31 of the wiper arm are received between the sidewalls of the blade support 2. The wiper arm is thus doubly guided inside the blade support—first by the cooperation between the bosses 33 and the slots 30, and secondly by the cooperation between the members 31 and the sidewalls of the channel member constituting the blade support 2.

The principal advantages of this embodiment are the same as those of the embodiment shown in FIGS. 1 and 2, but the amount of play between the wiper arm and blade support, during operation of the wiper, is reduced because of the double lateral guiding.

It will, of course, be appreciated that the embodiments which have been described have been given purely by way of illustration and may be modified as to detail without thereby departing from the basic principles of the invention.

I claim:

1. Means for attaching a windshield wiper arm to a wiper blade support, said means comprising:
   a cylindrical member carried by said blade support and having two diametrically opposed flattened surface areas;
   a female member carried by said wiper arm and having a slot therein which receives said cylindrical member and is equal in width to the diametral distance between said flattened areas, which slot terminates in a circular seat having a radius equal to that of said cylindrical member;
   parallel sidewalls on said wiper arm provided with arcuate slots; and
   bosses on said blade support which slide in said slots when said arm is swung relative to said blade support.

2. Attaching means as claimed in claim 1 in which said blade support is provided with parallel sidewalls between which the sidewalls on said wiper arm are guided when said arm is swung relative to said blade support, said bosses being formed on the sidewalls of said blade support.